(12) United States Patent
Jiang et al.

(10) Patent No.: US 7,904,907 B2
(45) Date of Patent: Mar. 8, 2011

(54) PROCESSING ARCHITECTURE HAVING PASSIVE THREADS AND ACTIVE SEMAPHORES

(75) Inventors: Hong Jiang, San Jose, CA (US); Thomas A. Piazza, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 1182 days.

(21) Appl. No.: 10/750,583

(22) Filed: Dec. 31, 2003

(65) Prior Publication Data
US 2005/0155034 A1  Jul. 14, 2005

(51) Int. Cl.
*G06F 9/46* (2006.01)

(52) U.S. Cl. .................................................. 718/104

(58) Field of Classification Search .............. 718/1, 100; 710/200, 240; 712/28; 709/217; 707/1
See application file for complete search history.

(56) References Cited

U.S. PATENT DOCUMENTS

| | | | |
|---|---|---|---|
| 4,725,946 A | | 2/1988 | Prange et al. |
| 5,771,382 A | * | 6/1998 | Wang et al. .................. 718/100 |
| 5,951,672 A | * | 9/1999 | Kwok et al. ................... 712/28 |
| 6,018,785 A | | 1/2000 | Wenniger |
| 6,026,427 A | | 2/2000 | Nishihara et al. |
| 6,978,330 B1 | * | 12/2005 | Joffe et al. .................... 710/240 |
| 7,237,013 B2 | * | 6/2007 | Winkeler et al. ............. 709/217 |
| 2005/0080760 A1 | * | 4/2005 | Haghighat et al. ............... 707/1 |

* cited by examiner

*Primary Examiner* — Li B Zhen
*Assistant Examiner* — Eric C Wai
(74) *Attorney, Agent, or Firm* — Trop, Pruner & Hu, P.C.

(57) ABSTRACT

Multiple parallel passive threads of instructions coordinate access to shared resources using "active" semaphores. The semaphores are referred to as active because the semaphores send messages to execution and/or control circuitry to cause the state of a thread to change. A thread can be placed in an inactive state by a thread scheduler in response to an unresolved dependency, which can be indicated by a semaphore. A thread state variable corresponding to the dependency is used to indicate that the thread is in inactive mode. When the dependency is resolved a message is passed to control circuitry causing the dependency variable to be cleared. In response to the cleared dependency variable the thread is placed in an active state. Execution can proceed on the threads in the active state.

5 Claims, 4 Drawing Sheets

PROCESSING ARCHITECTURE HAVING PASSIVE THREADS AND ACTIVE SEMAPHORES

TECHNICAL FIELD

The invention relates to techniques and architectures for multi-threaded processing. More particularly, the invention relates to techniques and architectures using passive threads and active semaphores for multi-threaded processing.

BACKGROUND

A "semaphore" (also referred to as "critical sections" or "mutex") is a hardware and software construct that allows coordination or synchronization of operations in which multiple processes compete for shared resources (e.g., memory, files). In general, a semaphore is a value that is stored in a designated location in operating system memory that processes can check and change. Based on the value of the semaphore, a process can either access the shared resource or wait for a period of time and check the semaphore again.

Semaphores in conventional computer systems are typically implemented as software routines using hardware support of atomic "test and set" or similar types of instructions (e.g., lock, bit test, bit test and set, bit test and reset). Using this semaphore implementation, a producer-consumer communication relationship can be established through shared (e.g., global) data and one or more semaphores. The semaphore allows shared data to be modified by a selected one of multiple processes that are attempting to modify the data, which provides data consistency.

This semaphore construct is "passive" because threads must perform polling operations to acquire a semaphore. The polling requirement consumes processor and system resources that could otherwise be used for other purposes. Therefore, traditional semaphores can result in inefficiencies.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Active semaphores to be used with passive threads are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Overview of an Example Use of Active Semaphores

Described herein is an architecture and associated methods in which multiple parallel passive threads of instructions (hereinafter referred to as "threads") coordinate access to shared resources using "active" semaphores. The semaphores are referred to as active because the semaphore entity sends messages to execution and/or control circuitry to cause the state of a thread to change. For example, a thread can be placed in a sleep (or inactive) mode by a thread scheduler in response to an unresolved dependency, which can be indicated by a semaphore. A thread state variable corresponding to the dependency is used to indicate that the thread is in sleep mode.

When the dependency is resolved a message is passed to control circuitry (e.g., the thread scheduler) causing the dependency variable to be cleared. In response to the cleared dependency variable the thread is placed in an active (or wake) state. Execution can proceed on the threads in the active state.

Continuing with the example above, if a thread attempts to acquire a semaphore and cannot, that thread is placed in an inactive state. Because the thread is inactive, it cannot poll the semaphore to determine when the dependency indicated by the semaphore is resolved, as is required in the prior art. The thread remains in the inactive state until a message is received (e.g., from the semaphore entity) indicating that the dependency has been resolved. In response to the message, the thread is placed in the active state, which allows execution to proceed.

Figure 1:
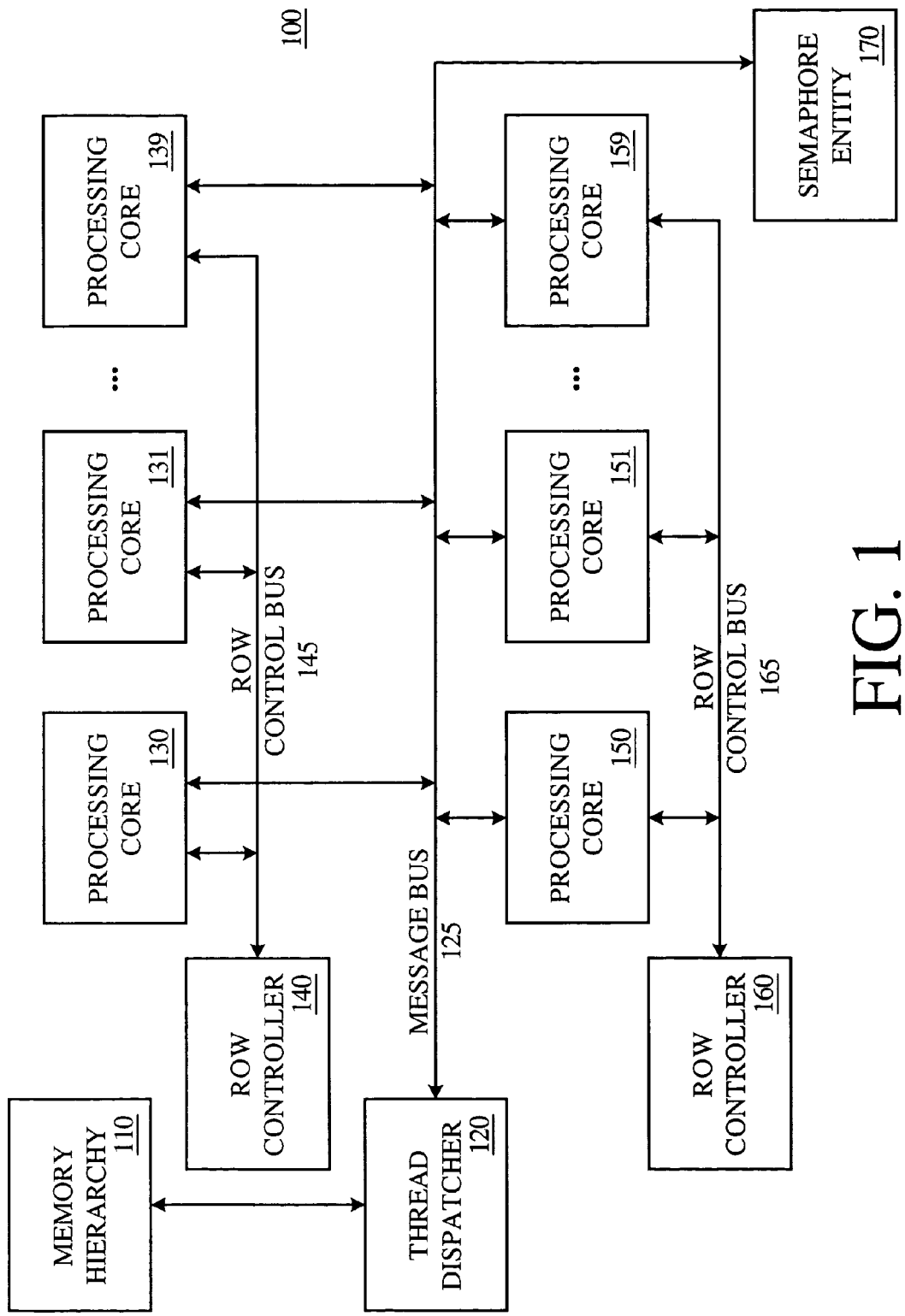
FIG. 1 is a block diagram of one embodiment of a massively multi-threaded processor architecture.

FIG. 1 is a block diagram of one embodiment of a massively multi-threaded processor architecture. As used herein, the label "massively multi-threaded" architecture refers to an architecture that includes multiple processors that can support multi-threaded execution. In one embodiment, each processor may support one or multiple threads. Multi-threading on a single processor achieves high execution efficiency by allowing active threads to be executed while other threads are in inactive state. A thread in the inactive state pending on a semaphore does not consume/waste processor resources. Notwithstanding the description with respect to a massively multi-threaded architecture, the semaphore constructs and associated methods are applicable to any multi-threaded architecture regardless of the number of threads supported.

Massively multi-threaded system 100 includes memory hierarchy 110 that stores data and instruction to be used during execution by one or more processing cores. Memory hierarchy 110 may include dynamic random access memory (DRAM), one or many levels of instruction caches, one or many levels of data caches, and/or one or many levels of shared instruction and data caches in any manner known in the art. Thread dispatcher 120 is coupled with memory hierarchy 110, receives information such as instruction pointer and data and/or data pointer associated with a new thread. Thread dispatcher 120 also coupled with the processing cores via message bus 125. In one embodiment, thread dispatcher 120 is responsible of managing the thread resources of the processing cores. Upon receiving a new pending thread, thread dispatcher 120 selects one processing core that has the resource to execute the pending thread and dispatches the thread onto the selected processing core. Upon the completion of an existing thread on a processing core, thread dispatcher 120 is informed, consequently, making the thread resource on the processing core available for future pending threads.

System 100 is illustrated with multiple processor cores (130, 131, 139, 150, 151 and 159), each of which include execution circuits with associated control circuitry. The processor cores can be identical or the processor cores can have varying functionality. Any number of processor cores can be included in system 100. In one embodiment, the processor cores are configured in rows, each row having a row controller. For example, row controller 140 can be coupled with processor cores 130, 131 and 139 via row control bus 145. Similarly, row controller 160 can be coupled with processor cores 150, 151 and 159 via row control bus 165.

The processor cores are also coupled with semaphore entity 170 via message bus 125. Semaphore entity 170 includes memory and control logic to provide semaphore functionality as described herein. In one embodiment, semaphore entity 170 interacts with the processor cores by transmitting and receiving messages as described in greater detail below.

Thread dispatcher 120 is also coupled with semaphore entity 170 via message bus 125. In one embodiment, thread dispatcher interacts with semaphore entity 170 on behalf of a thread by transmitting and receiving messages as described in greater detail below.

Control circuitry in each processing core may contain thread scheduling circuitry to manage the state of multiple threads executing on the same processing core and may also contain instruction scheduling circuitry to execute an active thread of instructions. During instruction execution, one or more of the processing cores will attempt to access shared system resources. In order to gain control of a shared system resource a thread, through the corresponding execution core, must gain control of a semaphore corresponding to the shared system resource to be accessed.

In one embodiment, in order to gain control of a semaphore, the requesting processing core sends a semaphore request message to semaphore entity 170 over message bus 125. After sending the semaphore request message, the requesting thread is placed in an inactive state in which execution and associated operations (e.g., polling of semaphores) halts.

In response to receiving the semaphore request message, semaphore entity 170 determines whether to grant control of the semaphore to the requesting thread. When the semaphore is granted, semaphore entity 170 sends a semaphore acknowledge message to the requesting thread. In response to the semaphore acknowledge message, the requesting thread is restored to an active state in which execution using the requested resource continues. When the thread has completed use of the shared resource, the thread sends a release semaphore message to semaphore entity 170. In response to the release semaphore message, semaphore entity 170 releases the semaphore and allows other threads to gain access to the system resource.

In one embodiment, semaphores are supported by instructions (semaphore instructions) that are executed by a processing core as well as messages (semaphore messages) that are passed between processing cores and semaphore entity over, for example, a message bus 125. In alternate embodiments, different and/or additional messages or instructions can be supported.

Semaphore Entity Based on a Linked List

Figure 2:
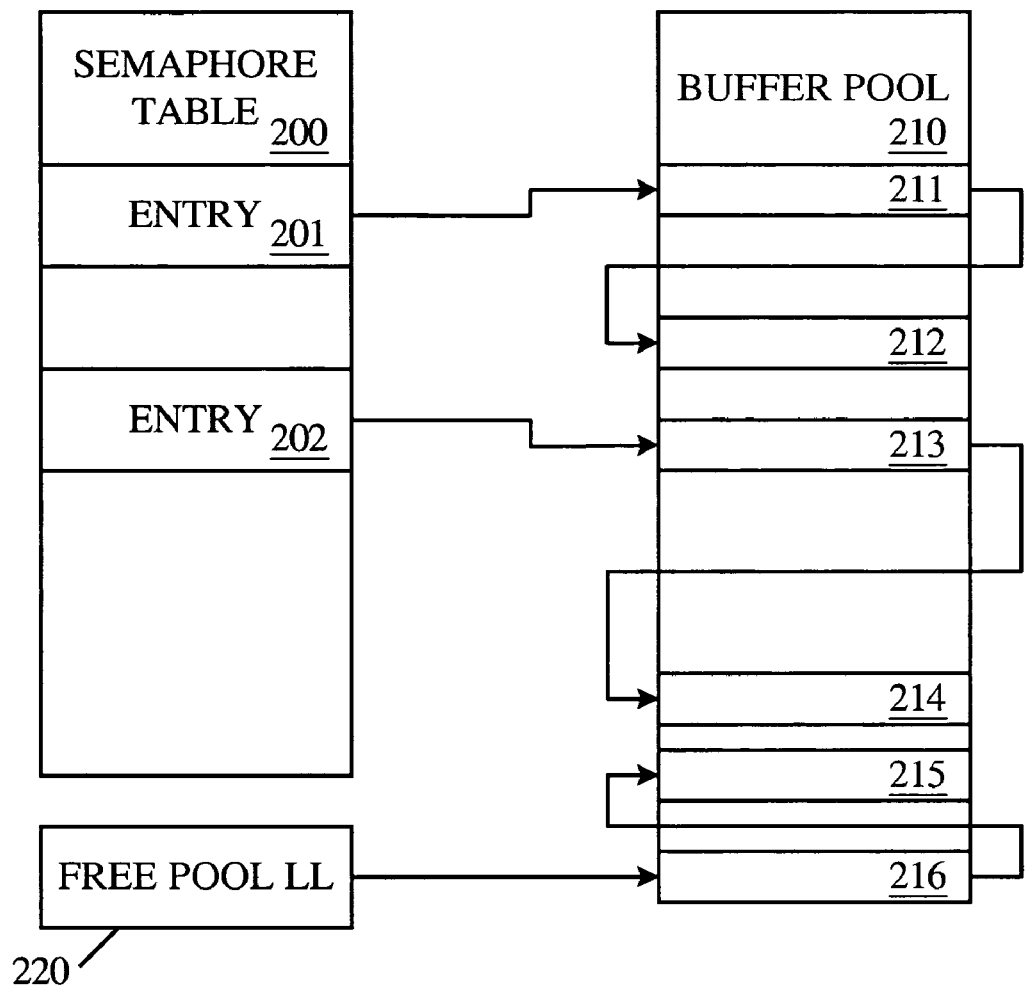
FIG. 2 is a conceptual block diagram of one embodiment of a linked list based semaphore structure.

FIG. 2 is a conceptual block diagram of one embodiment of a linked list based semaphore structure. In one embodiment, traditional per semaphore queues are replaced by a buffer pool having entries that are used to form a linked list for each semaphore. Thus, each semaphore can be a head pointer to a linked list formed from entries in the buffer pool. The linked list can be either a bi-directional linked list or a uni-directional linked list.

In one embodiment, semaphore table 200 includes a pointer for each semaphore supported (e.g., semaphore entries 201, 202). In one embodiment, the pointers in semaphore table 200 are head pointers that indicate a head of a linked list to be used for the corresponding semaphore. In one embodiment, free pool pointer 220 indicates the head of buffer pool 210 and unused semaphore entries include a NULL pointer.

In one embodiment, each semaphore entry (e.g., 211, 212, 213, 214, 215, 216) includes a released-state field, an ack-suppression field, a thread identifier field, a previous pointer and a next pointer. In alternate embodiments, other and/or different fields can be used, for example, the previous pointer can be omitted. In one embodiment, each semaphore can also include a single bit (or other indicator) to indicate whether the linked list corresponding to the semaphore is empty.

In the example of FIG. 2, free pool pointer 220 points to the head of the free entries in buffer pool and each of the free entries include a pointer to a subsequent free entry, for example, head free entry 216 includes a pointer to free entry 215. Semaphores similarly have an associated linked list. For example, entries 201 and 202 in semaphore table 200 correspond to active semaphores. Entry 201 includes a pointer to entry 211, which is the head entry in the semaphore linked list and includes a pointer to entry 212, which is a subsequent entry in the linked list. Similarly, entry 202 includes a pointer to entry 213, which is the head entry in the semaphore linked list and includes a pointer to entry 214, which is a subsequent entry in the linked list.

Semaphore Messages

An Acquire Semaphore Message (ACQ_MSG) is used for a thread, or a thread dispatcher on behalf of a thread, to make a request to the semaphore entity for ownership of a semaphore. In one embodiment, the ACQ_MSG contains a semaphore identifier field, a thread identifier field, an "auto-release" field and an "acknowledge-suppression" (ack-suppression) field. The auto-release field is used for a thread with only a head dependency. That is, the thread depends on previous threads, but no subsequent threads depend on the thread. The ack-suppression field is used for a thread with only a tail dependency. That is, the thread does not depend on any previous threads, but the thread does have subsequent threads depending on it. The ACQ_MSG can be issued by a thread dispatcher or other control circuitry associated with the thread.

In one embodiment, upon receiving the ACQ_MSG the semaphore entity enqueues the semaphore entry for the request thread to a linked list of the target semaphore (specified by the semaphore identifier field) by removing the head entry from a free pool list and adding it to the tail of the selected semaphore. The fields of the semaphore entry are updated based on the information in the ACQ_MSG: the thread identifier field, the release-state field and the ack-suppression field are replaced by the requester's thread identifier, the auto-release field and the ack-suppression field in the ACQ_MSG. If the semaphore linked list is not empty before the ACQ_MSG no message is sent by the semaphore entity. Otherwise, if the semaphore linked list is empty before the ACQ_MSG is received one of the following actions is taken.

If the ack-suppression field is not set an ACK_MSG with the thread identifier is sent from the semaphore entity on the message bus 125 to the requesting thread. If the ack-suppression field is set no ACK_MSG is sent from the semaphore entity. If the auto-release field is not set, the just-enqueued semaphore entry is maintained in the semaphore linked list. Consequently, the semaphore linked list is not empty and the semaphore is currently owned by the thread. If the auto-release field is set the just-enqueued semaphore entry is removed from the semaphore linked list, and consequently, the semaphore linked list is empty.

A Release Semaphore Message (REL_MSG) is used for a thread to make a request to the semaphore entity to free ownership of a semaphore. In one embodiment, the REL_MSG includes a semaphore identifier field and a thread identifier field. In one embodiment, the REL_MSG can only be issued by control circuitry associated with a thread holding ownership of the semaphore, i.e., the thread identifier is at the top of the semaphore linked list. Upon receiving the REL_MSG the semaphore entity removes the entry from the head of the semaphore linked list.

In another embodiment, the REL_MSG can be issued by control circuitry associated with any thread sharing the semaphore. Upon receiving the REL_MSG the semaphore entity unsets the release-state field to the corresponding entry in the semaphore linked list regardless of the position of the entry in the linked list. If semaphore entry is at the head of the linked list, the entry is removed from the head of the semaphore linked list. The next entry is then becoming the head of the linked list. If the next entry is not NULL, it will be examined. If the new head of the linked list has the release-state field set, it is again removed from the head of the semaphore linked list.

In one embodiment, this recursive process continues until either the head of the linked list is NULL (the semaphore queue is empty) or the head of the linked list has the released-state field unset (waiting for the release of the semaphore from the thread corresponding to the entry). If the head of the linked list is not NULL and the ack-suppression field is not set, an ACK_MSG is sent by the semaphore entity to the thread identified by the entry's thread identifier field. If the head of the linked list is not NULL and the ack-suppression field is set, no ACK_MSG is sent.

The Semaphore Acknowledgement Message (ACK_MSG) is generated by the semaphore entity to notify a thread that the requested semaphore has been acquired. In one embodiment, the ACK_MSG includes a semaphore identifier field and a thread identifier field. The ACK_MSG is issued only by the semaphore entity and received by the processing core executing the thread identified by in the thread identifier field.

Upon receiving the ACK_MSG the receiving processing core unsets the wait-semaphore state field of the thread identified by the thread identifier field. If the thread is in an inactive state, the thread state is changed to an active state.

Semaphore Instructions

An Acquire Semaphore (ACS) instruction causes an ACQ_MSG message to be sent to the semaphore entity with a semaphore identifier of the requested semaphore, the thread identifier of the requesting thread and with the auto-release field unset. The thread is put in an inactive state with the wait-semaphore state field set. The ACS instruction is paired with (followed by) a Release Semaphore (RLS) instruction (described below). The ACS-RLS instruction pair can be used, for example, for critical section applications.

An Acquire Semaphore with Auto-Release (ASR) instruction causes an ACQ_MSG to be sent to the semaphore entity with a semaphore identifier for the requested semaphore, a thread identifier of the requesting thread and with the auto-release field set. The thread is put in an inactive state with the wait-semaphore state field set. In one embodiment, the ASR instruction cannot be paired with the RLS instruction. In one embodiment, the ASR instruction is used for threads with only a head dependency.

A Wait Semaphore (WTS) instruction causes the wait-semaphore thread state field to be checked. If the state field is set the thread is put in the inactive state. If the state field is not set the thread remains in the active state. No message is sent to the semaphore entity in response to a WTS instruction. Use of the WTS instruction implies that the semaphore was acquired previously by the thread dispatcher using the ACQ_MSG on behalf of the thread at the thread dispatch time. The WTS instruction is not used if the ack-suppression field is set in the ACQ_MSG previously issued by the thread dispatcher.

A Release Semaphore (RLS) instruction causes a REL_MSG to be sent to the semaphore entity with a semaphore identifier for the semaphore being released and a thread identifier for the releasing thread. The releasing thread remains in the active state. If an ACS instruction has been previously issued for the releasing thread only one RLS instruction is issued. If an ASR instruction has been previously issued for the releasing thread no RLS instruction is issued. If a WTS instruction has been issued for the releasing thread, the WTS instruction may or may not be followed by a RLS instruction depending on the auto-release field of the ACQ_MSG sent by the thread dispatcher. If the auto-release field is unset, no RLS instruction should be issued. If the auto-release field is set a RLS instruction should follow the WTS instruction.

Example Acquisition of an Active Semaphore

Figure 3:
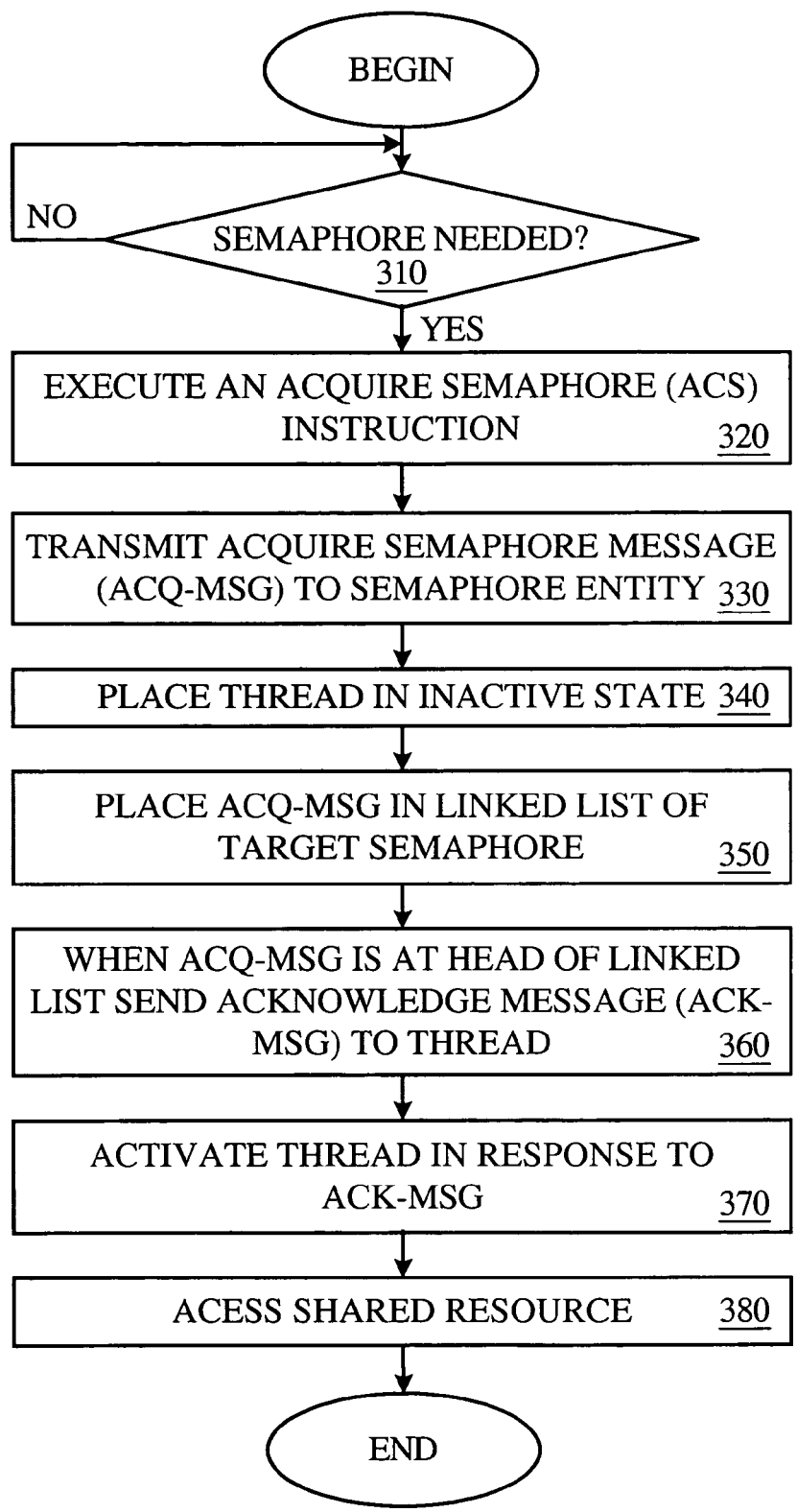
FIG. 3 is an event flow diagram of one embodiment of a technique for acquiring an active semaphore.

FIG. 3 is an event flow diagram of one embodiment of a technique for acquiring an active semaphore. The example of FIG. 3 is provided with reference to specific instructions, messages, processing components and data structures. However, acquisition active semaphores can be implemented using other instructions, messages, processing components and/or data structures.

As a thread of instructions is executed by a processing core, the instructions are executed when resources are available. When a resource having a semaphore is required, for example, a shared memory location, ownership of a semaphore may be required to access the resource. Thus, execution of the thread of instructions is accomplished in any manner known in the art until a semaphore is needed, 310.

In one embodiment, when a semaphore is needed, 310, an Acquire Semaphore (ACS) instruction is executed, 320. The ACS instruction can be executed by the processing core executing the thread of instructions requesting the semaphore. As part of, or in response to, execution of the ACS instruction, an Acquire Semaphore Message (ACQ_MSG) is transmitted to the semaphore entity by the processing core executing the thread over the message bus, 330. One format for the ACQ_MSG is described above. Other formats can also be used.

As part of, or in response to, execution of the ACS instruction, the thread requesting the semaphore is placed in an inactive state with the wait-semaphore state field set, 340. By placing the thread in the inactive state, instructions in the thread are not executed, which includes polling of the requested semaphore should the initial semaphore request be refused. By placing the thread in the inactive state processor resources and system bandwidth are not consumed by the thread waiting for the semaphore. For a processing core supporting multi-threading, the processor resources and system bandwidth can be used by other active threads.

The semaphore entity receives the ACQ_MSG and places the requester information entry in the linked list of the target semaphore, 350. If the semaphore is not owned or controlled by another thread, the semaphore entry is placed at the head of the semaphore linked list because there are no other entries. If the semaphore is owned or controlled by another thread, the semaphore entry is placed at the tail of the semaphore linked list. In one embodiment, the tail of the linked list is identified by traversing the linked list entries in the buffer pool from a head entry to a tail entry and the new entry becomes the new tail entry. In another embodiment, the tail of the linked list is directly identified by the tail pointer of the linked list stored in the semaphore table.

As threads complete use of the resource corresponding to the semaphore the thread holding the semaphore releases control of the semaphore, which is described in greater detail below. When a semaphore is released the corresponding semaphore entry at the head of the semaphore linked list is removed and the subsequent semaphore entry in the linked list becomes the head of the linked list.

When a semaphore entry becomes the head of the semaphore linked list, its state fields are examined by the semaphore entity. If the ack-suppression field is not set, an acknowledgement message (ACK_MSG) is transmitted from the semaphore entity to the thread associated with the semaphore entry, 360. One format for the ACK_MSG is described above. Other formats can also be used. The ACK_MSG indicates to the receiving entity (e.g., a thread) that the receiving entity has been granted control of the corresponding semaphore.

In response to the ACK_MSG the corresponding thread is activated, 370. When activated, processing of instructions in the thread resumes and the shared resource corresponding to the semaphore can be accessed, 380. When the thread has completed access to the shared resource the semaphore is released, which is described in greater detail below.

Example Release of an Active Semaphore

Figure 4:
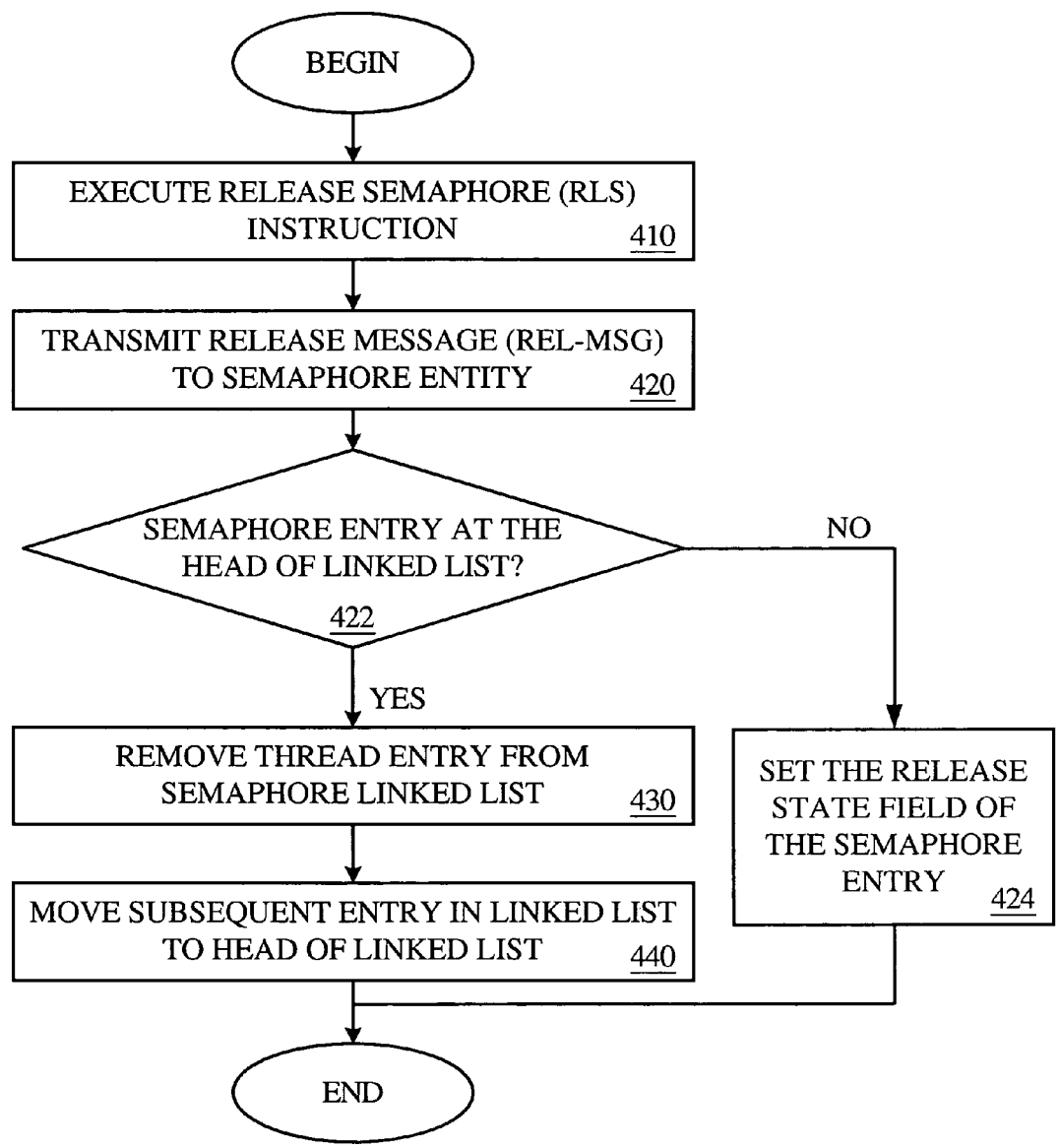
FIG. 4 is a flow diagram of one embodiment of a technique for releasing an active semaphore.

FIG. 4 is a flow diagram of one embodiment of a technique for releasing an active semaphore. As with the example of FIG. 3, the example of FIG. 4 is provided with reference to specific instructions, messages, processing components and data structures. However, release of active semaphores can be implemented using other instructions, messages, processing components and/or data structures.

In one embodiment, a semaphore is released when a Release Semaphore (RLS) instruction is executed, 410. The RLS instruction can be executed by the processing core executing the thread of instructions requesting the semaphore. As part of, or in response to, execution of the RLS instruction, a Release Semaphore Message (REL_MSG) is transmitted to the semaphore entity, 420. One format for the REL_MSG is described above. Other formats can also be used.

In response to the REL_MSG, the semaphore entity matches the thread identifier field of the REL_MSG with the semaphore linked list. The semaphore entity checks whether the corresponding semaphore entry is at the head of the linked list, 422. If the corresponding semaphore entry is at the head of the linked list, the semaphore entity removes the thread entry from head of the linked list, 430. The subsequent entry in the linked list becomes the head entry, 440. The semaphore can then be granted to the thread corresponding to the new head entry. If the corresponding semaphore entry is not at the head of the linked list, the semaphore entity set the release-state field of the semaphore entry, 424.

CONCLUSION

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus comprising:
   an execution circuit to receive and execute a thread of instructions, wherein the execution circuit transmits a semaphore request message and places the thread in an inactive state in response to the thread of instructions requiring a resource having an associated semaphore; and
   a semaphore entity coupled with the execution circuit to receive the semaphore request message from the execution circuit and to selectively grant control of the semaphore in response to the semaphore request message by transmitting a semaphore acknowledge message to the execution circuitry, wherein the execution circuitry, in response to receiving the semaphore acknowledge message, removes the thread of instructions from the inactive state, grants the resource to the thread when the resource becomes available, and resumes execution of the thread of instructions including accessing the resource associated with the semaphore.

2. The apparatus of claim 1 further comprising: at least one additional execution circuit to execute threads of instructions; and a thread dispatcher coupled with the execution circuit and at least one additional execution circuit to dispatch threads for execution by selected execution circuits.

3. The apparatus of claim 1 wherein when the thread of instructions is in the inactive state, execution of the instructions ceases and the execution circuitry does not poll the semaphore entity to determine a status of the semaphore request message.

4. An apparatus comprising:
   an execution circuit to receive and execute a thread of instructions, wherein the execution circuit transmits a semaphore request message and places the thread in an inactive state in response to the thread of instructions requiring a resource having an associated semaphore; and
   a semaphore entity coupled with the execution circuit to receive the semaphore request message from the execution circuit and to selectively grant control of the semaphore in response to the semaphore request message by transmitting a semaphore acknowledge message to the execution circuitry, wherein the execution circuitry, in response to receiving the semaphore acknowledge message, removes the thread of instructions from the inactive state and grants the resource to the thread when the resource becomes available, wherein when the thread of instructions is in the inactive state, execution of the instructions ceases and the execution circuitry does not poll the semaphore entity to determine a status of the semaphore request message.

5. The apparatus of claim 4 further comprising: at least one additional execution circuit to execute threads of instructions; and a thread dispatcher coupled with the execution circuit and at least one additional execution circuit to dispatch threads for execution by selected execution circuits.

* * * * *